(12) United States Patent
Gilbert

(10) Patent No.: US 6,422,346 B1
(45) Date of Patent: Jul. 23, 2002

(54) LUBRICATING OIL PUMPING SYSTEM

(75) Inventor: Kenneth T. Gilbert, Bluff City, TN (US)

(73) Assignee: Bristol Compressors, Inc, Bristol, VA (US)

( * ) Notice: Subject to any disclaimer, the term of this patent is extended or adjusted under 35 U.S.C. 154(b) by 0 days.

(21) Appl. No.: 09/455,007

(22) Filed: Dec. 3, 1999

Related U.S. Application Data

(63) Continuation-in-part of application No. 09/320,804, filed on May 27, 1999, now abandoned.

(51) Int. Cl.⁷ .................................................. F01M 1/00
(52) U.S. Cl. ......................... 184/6.16; 184/31; 418/64
(58) Field of Search ............... 184/6, 6.16, 26, 184/31, 37; 418/54, 64, 68

(56) References Cited

U.S. PATENT DOCUMENTS

| | | | |
|---|---|---|---|
| 3,393,770 A | * 7/1968 | Fertik et al. ............... | 184/6 |
| 4,245,968 A | * 1/1981 | Buschbom et al. .......... | 418/87 |
| 5,564,917 A | * 10/1996 | Leyderman et al. ......... | 418/63 |
| 5,678,657 A | * 10/1997 | Lee ........................... | 184/6.16 |

* cited by examiner

Primary Examiner—David Fenstermacher

(57) ABSTRACT

In a gas compressor having a crankcase rotatably supporting a drive shaft connected to and adapted for operating compression generating structure of the compressor, the shaft being connected to an electrical motor for being driven thereby in either rotational direction, and the shaft having an oil passage formed generally longitudinally therein for conveying lubricating oil to various portions of the compressor, unique oil pump structure having from one to about six slots formed generally radially thru a portion of the shaft and communicating with the oil passage, an elongated vane slidably mounted in each slot for movement both longitudinally and laterally thereof to provide an oil conduit alongside each of the vanes regardless of the direction of rotation of the shaft, a wall slidably enclosing the shaft portion and having a circular inner surface eccentrically positioned with respect to the shaft portion such that a small vertical segment of the inner surface lies adjacent the shaft portion to thereby provide a generally crescent shaped pumping chamber between the shaft and the inner surface, and an oil inlet provided thru the wall and communicating with the pumping chamber and adapted to communicate with oil in the compressor oil sump.

14 Claims, 4 Drawing Sheets

Fig. I

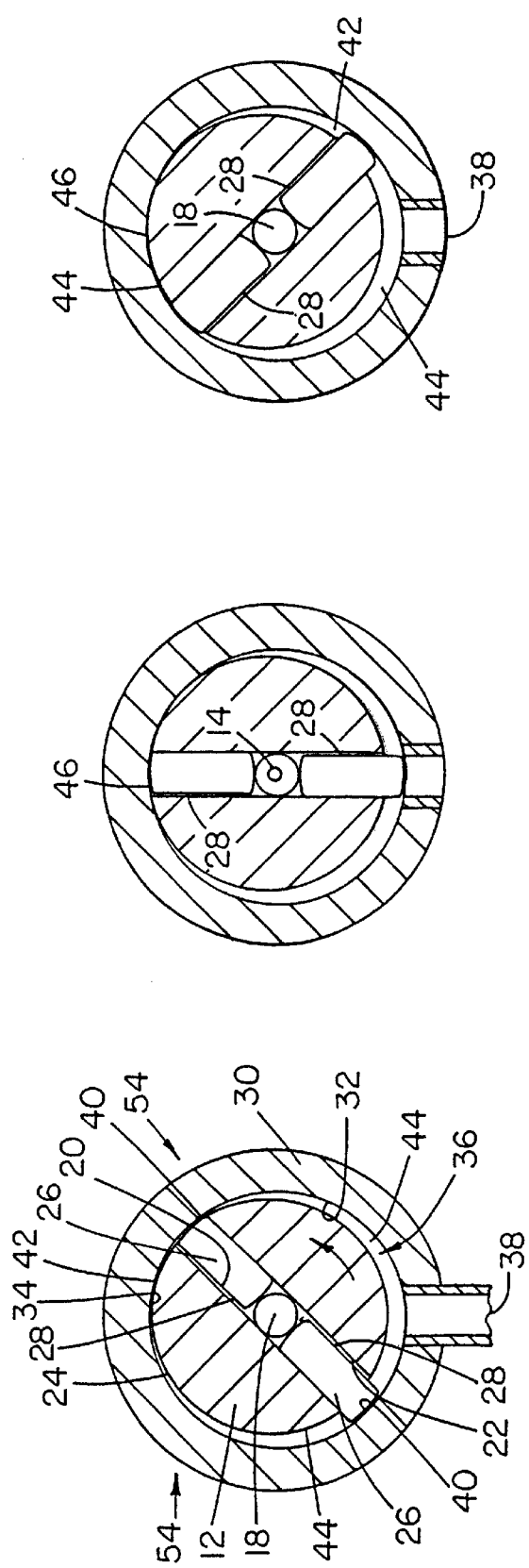
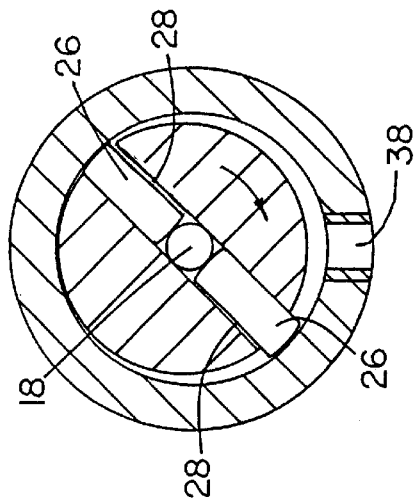
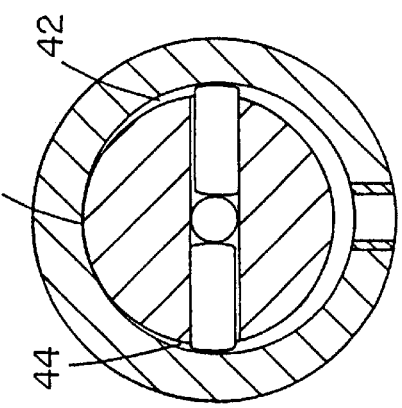

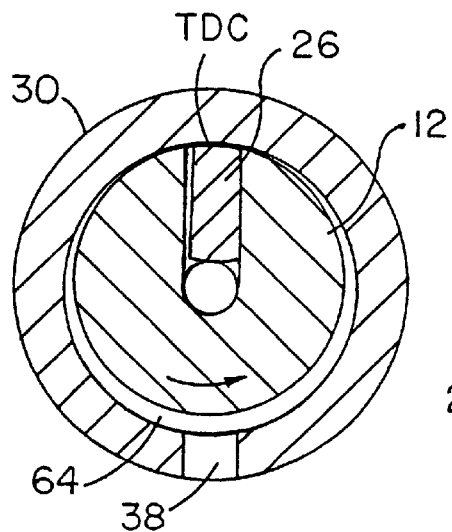
Fig. IIA
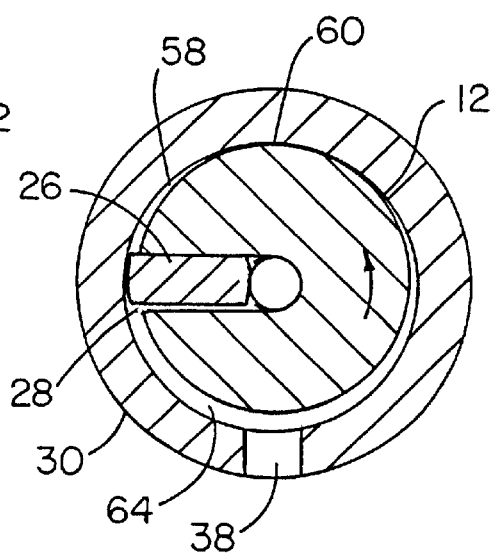
Fig. IIB
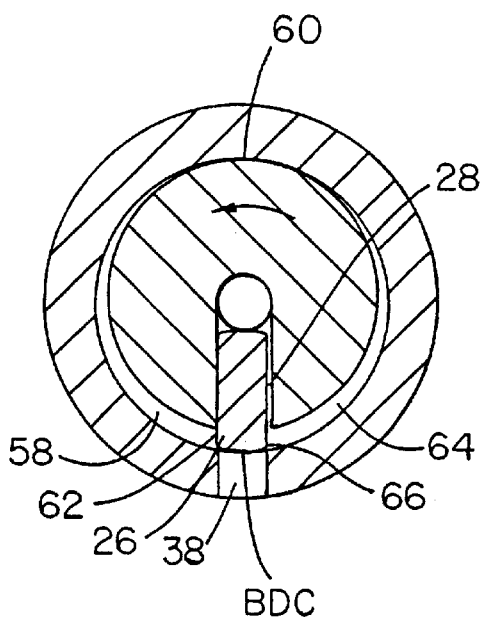
Fig. IIC
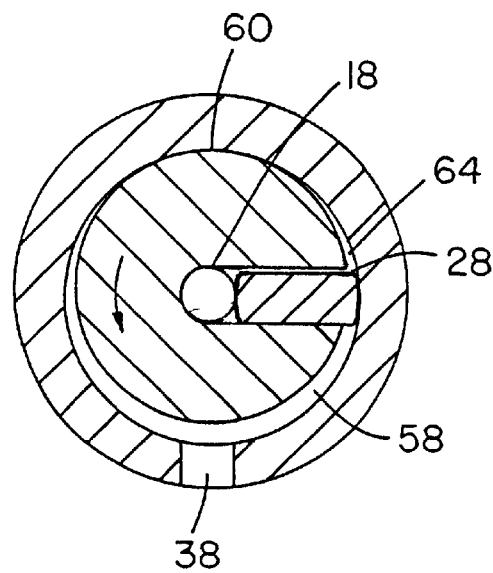
Fig. IID

US 6,422,346 B1

LUBRICATING OIL PUMPING SYSTEM

This application is a continuation-in-part of Applicant's Ser. No. 09/320,804 filed May 27, 1999 now abandoned.

BACKGROUND OF THE INVENTION

1. Field

This invention concerns a unique pumping device for fluids, including gasses, of any type, and particularly concerns a lubricating oil pumping system or mechanism for work devices which are driven by drive shafts, including refrigeration compressors, pumps, or the like, particularly where the pumping system is associated with the drive shaft and wherein said shaft is driven by an electrical motor or other prime mover which is reversible in rotation, either intentionally or unintentionally.

Such work devices are shown, for example, in U.S. Pat. Nos. 4,479,419; 4,236,874; 4,494,447; 4,245,996; and 4,248,053, the disclosures of which are hereby incorporated herein by reference, in their entireties, and in pending U.S. application Ser. No. 09/133,841 filed Aug. 13, 1998; and Ser. No. 09/013,154 filed Jan. 26, 1998, the disclosures of which are hereby incorporated herein by reference in their entireties, and which applications are commonly owned with this present application. In these disclosures intentionally reversing direction of the drive motor causes one or more pistons to be fully or partially taken off line to thereby reduce the compressor capacity. Another such work device is the conventional refrigeration compressor which, for example, might use a three phase motor wherein, if the electrical connections are not properly made, the motor and drive shaft will rotate oppositely to what was intended.

In such situations described above, the lubricating oil pump, whatever its construction may be, must be able to deliver sufficient lubricating oil to compressor shaft bearings, wrist pin bearings and the like regardless of the direction of motor rotation.

2. Prior Art

Heretofore various and complicated lubricating oil pump mechanisms have been proposed for such rotationally reversible applications as disclosed in U.S. Pat. Nos. 4,331, 421; 4,331,420; 3,418,939; and 2,855,139. These mechanisms tend toward complex construction and valving, and, particularly from the perspectives of longevity, reliability, ease of manufacture and costs, are lacking.

A principal object therefore of the present invention is to provide a low cost, extremely simple, self-priming reversible oil pump structure which will pump in the same direction regardless of direction of rotation, and having extraordinary performance and longevity reliability, and being especially adapted for use in refrigerant compressors.

BRIEF SUMMARY OF THE INVENTION

The above and other objects hereinafter becoming evident have been attained in accordance with the present invention thru the discovery of unique structure for pumping fluids, which in one preferred embodiment of use is in a gas compressor having body or crankcase means, a drive shaft rotatably supported on said body means and connected to and adapted for operating compression generating structure of the compressor, said shaft having a rotational axis and being connected to electrical motor means for being driven thereby in either rotational direction, oil passage means formed in said shaft generally longitudinally thereof for conveying lubricating oil to various portions of said compressor, at least one slot formed generally laterally thru a portion of said shaft and communicating with said oil passage means, said slot having an elongated vane slidably mounted therein for functional movement both longitudinally and laterally of the slot but not vertically such as to provide thereby oil conduit means alongside said vane regardless of the direction of rotation of said shaft and regardless of the position of said vane in said slot, wall means slidably enclosing said shaft portion and contiguous portions of said shaft and having a circular inner surface section eccentrically positioned with respect to said rotational axis of said shaft such that a small vertical peripheral segment of said inner surface lies adjacent said shaft portion to thereby provide a generally crescent shaped pumping chamber between said shaft portion and said inner surface, and oil inlet means provided thru said wall means and communicating with said pumping chamber.

In certain preferred embodiments:

(a) the section of said oil passage means which lies within said portion of said shaft is substantially axial of said shaft and two slots are provided and are formed on the same diameter of said shaft;

(b) said segment and said inlet means are on substantially the same diameter of said shaft and on diametrically opposite sides thereof;

(c) said oil passage is coextensive with said slots at said rotational axis;

(d) for the embodiment of (a) hereof, the ratio of the volume in $in^3$ of said pumping chamber to the flow area in $in^2$ of said oil conduit means is from about 1.11 in. to about 1.38 in.;

(e) with reference to (d) above, said oil passage is a circular bore having a diameter of from about 0.15 to about 0.25 in; and (f) said wall means is formed in a lower bearing means affixed to the crankcase and which supports said drive shaft both laterally and longitudinally thereof.

BRIEF DESCRIPTION OF THE DRAWINGS

The invention will be further understood from the following description and drawings wherein certain structures or dimensions are enlarged for clarity:

FIGS. 6–9 are cross-sectional views taken along line 6-9 in FIG. 2, of the present oil pumping means in four progressive stages of counterclockwise shaft rotation;

FIG. 10 is a view as in FIG. 6 with the shaft in clockwise rotation; and

FIGS. 11A thru 11D show a single vane variation in four progressive stages of counterclockewise revolution as in FIGS. 6–9.

DETAILED DESCRIPTION OF THE DRAWINGS

Figure 1:
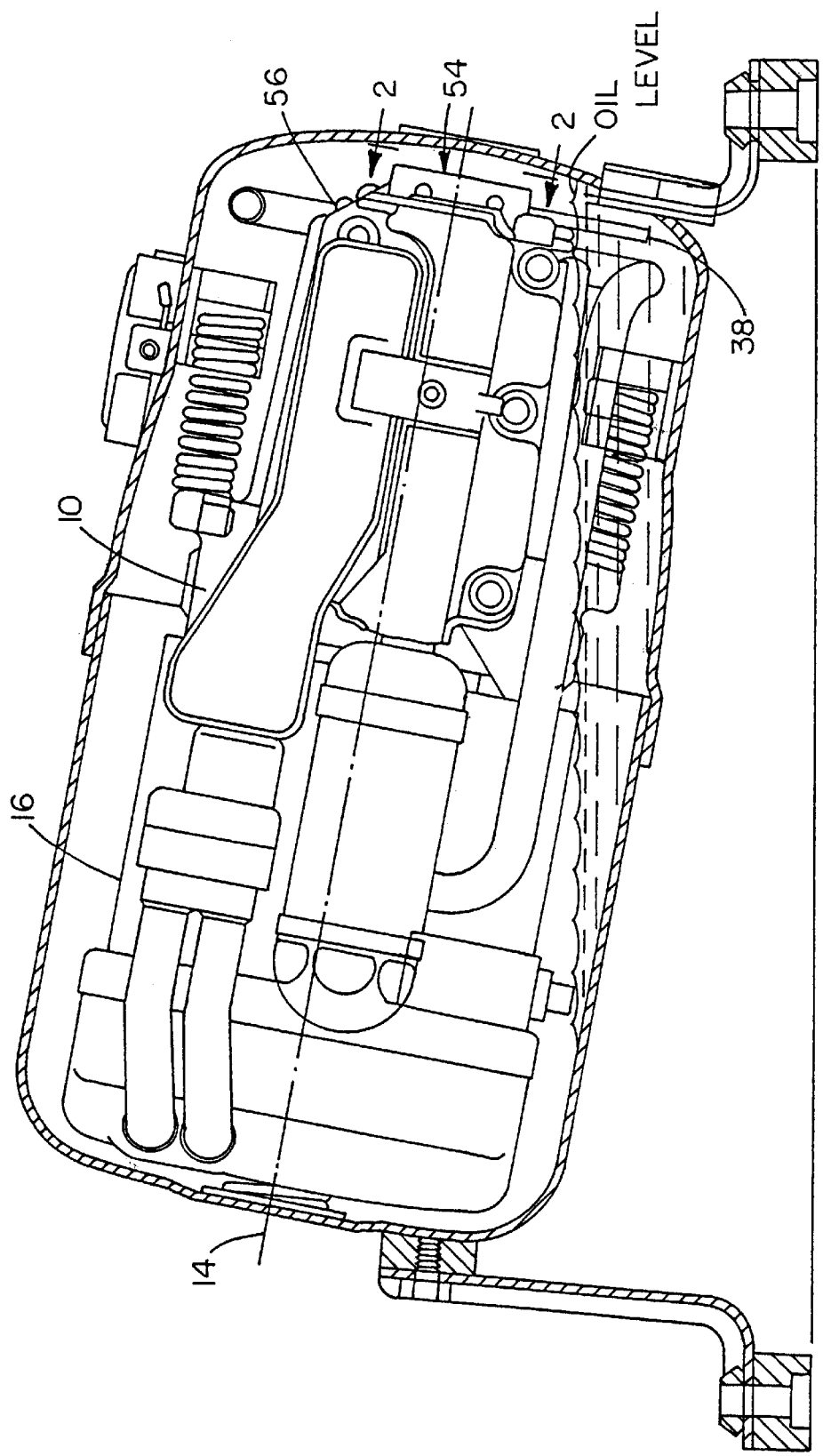
FIG. 1 is a side view of generally horizontally mounted, hermetically sealed piston type refrigerant compressor with the shell cross-sectioned.
Figure 2:
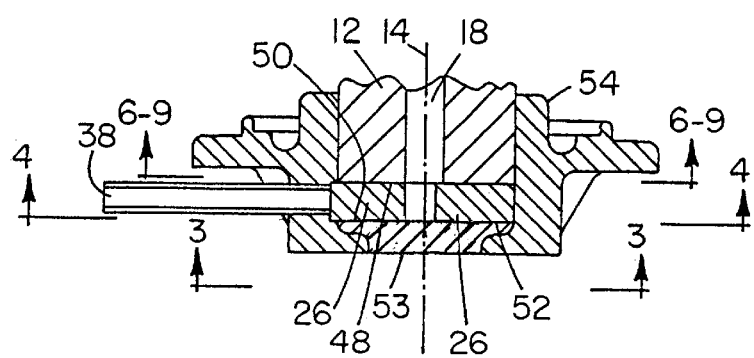
FIG. 2 is a cross-sectional view of the cage bearing and oil pump assembly taken along line 2—2 of FIG. 1 in the direction of the arrows.
Figure 3:
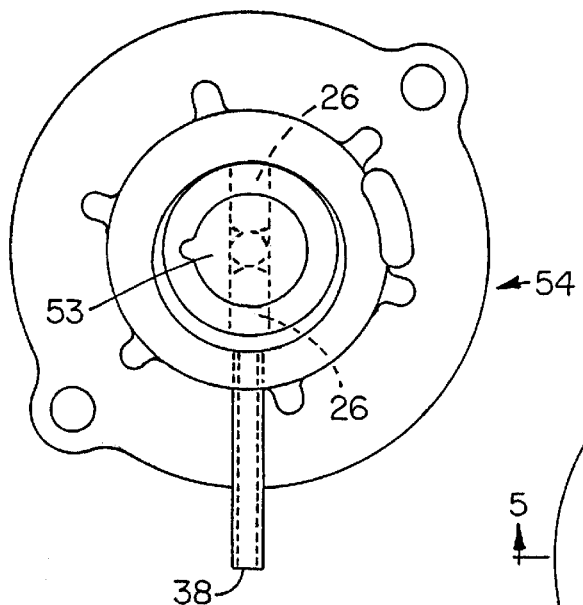
FIG. 3 is a bottom view of the cage bearing taken in the direction of line 3 in FIG. 2.
Figure 4:
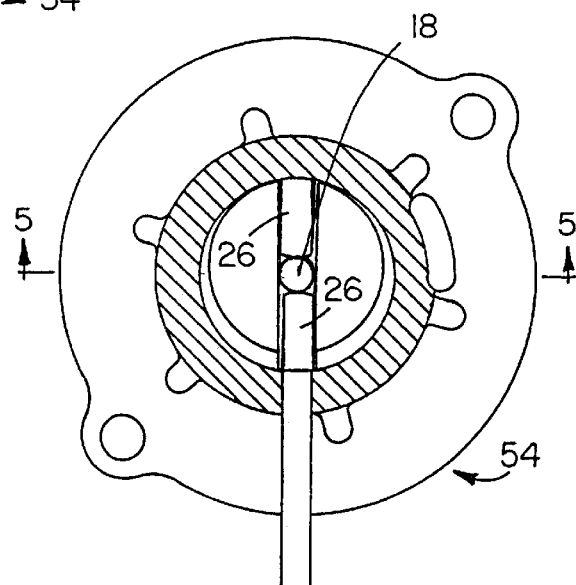
FIG. 4 is a cross-sectional view taken in the direction of line 4—4 in FIG. 2.
Figure 5:
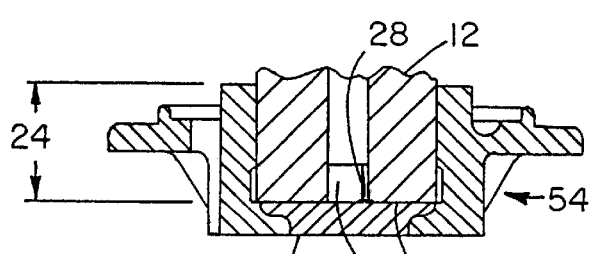
FIG. 5 is a view as in FIG. 2 taken along line 5—5 of FIG. 4.

The invention will be further understood from the following description of the drawings with reference to the claims hereof, wherein the present gas compressor is shown in one preferred embodiment in co-pending Ser. No. 09/215,371, filed Dec. 19, 1998, of common ownership with this application by way of assignment, the disclosure of said Ser. No. 09/215,771 application being hereby incorporated herein in its entirety. In the present drawings a body or crankcase means 10 rotatably supports a drive shaft or crankshaft 12 connected to and adapted for operating compression generating structure such as conventional cylinder-piston combinations of the compressor. The shaft has a rotational axis 14 and is connected to motor means 16 for being driven thereby in either rotational direction. Oil passage means 18 is formed in said shaft generally longitudinally thereof for conveying lubricating oil to various portions of said compressor such as drive shaft mounting bearings, wrist pins and the like.

The present oil pump means, in a preferred two vane construction comprises two slots 20,22 formed approximately radially thru a shaft portion generally designated 24 of said shaft and communicating with said oil passage means 18. Individaul elongated vanes 26 are slidably mounted in the slots for functional movement both longitudinally and laterally thereof, but not vertically of the slot to provide oil conduit means 28 alongside each vane regardless of the direction of rotation of said shaft or the position of any vane in its slot. A wall means 30 slidably encloses said shaft portion 24 and has circular inner surface means 32 eccentrically positioned with respect to said rotational axis 14 such that a small segment 34 of said inner surface lies adjacent said drive shaft to thereby provide a generally crescent shaped pumping chamber 36 between said drive shaft and said inner surface. An oil inlet means 38 is provided thru said wall means and communicates with said pumping chamber.

With reference to FIGS. 6–9 taken in progression, as the shaft rotates, centrifugal force throws the vanes radially outwardly against the inner surface means 32 and forms substantially a fluid-tight seal 40 between each vane end and surface 32. As a vane passes by inlet 38 the portion of pumping chamber 36 which lies in front of the vane becomes the compression or high pressure side of said chamber and the portion of said chamber which trails the vane becomes the suction or low pressure side of said chamber. Upon further shaft rotation oil is compressed on one side 42 of chamber 36 and sucked in through the suction port or inlet means 38 on the other side 44 of the chamber. Suction is created by expansion of the pumping chamber on other side 44, the pressure difference between 44 and 42 being maintained by oil flow resistance past segment 34 at the top 46 of the eccentric, by the seals 40 and by the flow resistance thru 28. As pressure goes up in 42, oil flows thru conduit means 28 between the vane and the slot side to the discharge port or oil passage 18. The above process pumps fluid in the same direction, regardless of the direction of shaft rotation. As shown in FIG. 10, the conduit means 28 are developed on the opposite side of the vanes relative to FIGS. 6–9, since the shaft is rotating in the opposite direction.

It is noted that the slots and vanes are dimensioned to provide functional, i.e., compression sealing of the vanes with inner surface means 32 thru longitudinal motion of the vanes, and development of conduit means 28 by lateral motion of the vanes thereof. Any vertical motion of the vanes is incidental and should be restricted such as to provide good sliding seals at tops 48 and bottoms 50 of the slots.

It is preferred that the slots are formed longitudinally into the bottom 52 of the shaft and that the inner surface means 32 is provided on a bearing means or cage 54 secured to the lower end 56 of the crankcase 10. Shaft bottom 52 rides on a solid thrust bearing 53 non-rotatably mounted in cage 54.

Referring to FIGS. 11A thru 11D, the single vane embodiment works the same way as the two-vane, but one of the leak paths is eliminated. In this embodiment as the pump shaft 12 rotates from top dead center (TDC), FIG. 11A, the vane 26 is seated against the inner wall of the housing 30 by centrifugal force. The cavity 58 created by the trailing edge of the vane grows as the shaft rotates, FIG. 11B, and a suction is created behind the vane in the cavity if the speed of shaft rotation is fast enough to overcome the leakage at the leak path 60 between the shaft and the inner wall of the housing. After the vane crosses the suction port 38 at bottom dead center (BDC), FIG. 11C, fluid flows into the vacuum in cavity 58 behind the trailing edge 62 of the vane until TDC is again reached.

During the next shaft revolution, this cycle is repeated, and the fluid 64 that was sucked into the suction cavity during the previous shaft revolution is pushed in front of the vane. The fluid flows thru the suction port 38, the conduit means 28, and the leak path 60 until the vane again passes over the suction port at BDC. At this point, if the speed of shaft rotation is fast enough to overcome the leakage at the leak path 60, the fluid 64 is compressed and forced to flow out thru 28 and the leak path 60.

At top dead center, the entire cycle begins again with the trailing edge 62 of the vane having sucked more fluid 64 into the housing 30 and the leading edge 66 of the vane preparing to force some of the fluid 64 thru 28 into oil passage 18.

Due to the placement of the suction port 38 along the pump's axis of symmetry and the tendency of the vane to move to the opposite wall of the slot in the shaft if shaft rotation is reversed, this pump will pump in the same direction, regardless of the direction of shaft rotation. The movement of the vane from one side wall of the shaft slot to the other seals the discharge conduit 28 on one side of the vane and opens another conduit 28 on the other side of the vane.

In a fully operational example of the best mode for practicing the present invention with a double vane oil pump, and a single cylinder compressor wherein the piston operates at full strokes or ½ stroke such as described in said aforementioned application Ser. Nos. 09/133,841 and 09/013,541.

Motor—reversible, squirrel cage induction, PSC, 1–3 hp;
Protector—Protects against overload in both load modes. Senses both "T" and current;

| | |
|---|---|
| Run Capacitor | 35 µF/370 VAC; |
| Speed (rated load) | 3550 rpm; |
| Motor Strength | 252 oz. ft. Max/90 oz. ft. rated load; |

Power Supply—Single or three phase of any frequency or voltage, e.g., 230V-60 H, single phase, or 460V-60 H, three phase;
Switching Mechanism—control conduit which is responsive to load requirements to operate solenoid contactor and place the run capacitor in series with either the start winding or main winding, depending on the load requirements.

The compressor would have substantially the following structure and operating characteristics:

| | |
|---|---|
| (a) size (capacity) | 3 Ton; |
| (b) number of cylinders | One; |
| (c) cylinder displacement at full throw | 3.34 in$^3$/rev; |
| (d) full stroke length | 0.805 in.; |
| (e) normal operating pressure range in full stroke mode | 77 to 297 Psig; |
| (f) the ratio of the pumping chamber 36 volume in in$^3$ to the flow area in in$^2$ is about 1.11 in to 1.38 in.; | |
| (g) oil passage 18 is a circular bore having a diameter of about 0.25 in.; and | |
| (h) the shaft diameter is about 1.125 in. | |

It is noted that the oil flow rates, e.g., ounces per second, which can be generated by the present pump far exceeds the capacity needed for proper lubrication. Therefore, leakage of oil from the high pressure side of chamber 36 to the low pressure side 44 thereof is of no concern.

This invention has been described in detail with particular reference to preferred embodiments thereof, but it will be understood that variations and modifications will be effected within the spirit and scope of the invention.

I claim:

1. A gas compressor having body means rotatably supporting a drive shaft connected to and adapted for operating compression generating structure of the compressor, said shaft having a rotational axis and being connected to motor means for being driven thereby in either rotational direction, oil passage means having a main section formed in said shaft generally longitudinally thereof for conveying lubricating oil to various portions of said compressor, oil pump means comprising slot means formed generally radially thru a portion of said shaft and intersecting with said main section of said oil passage means to place said oil passage means in continuous fluid communication with said slot means, elongated vane means slidably mounted in said slot means for functional movement both longitudinally and laterally of said slot means but not vertically of said slot means whereby oil discharge conduit means is provided alongside said vane means regardless of the direction of rotation of said shaft and of the position of said vane means in said slot means, stationary wall means on said body means radially enclosing and supporting said shaft portion for slidable rotation of said shaft portion therein, said wall means having circular inner surface means eccentrically positioned with respect to said rotational axis such that a small segment of said inner surface means lies adjacent said shaft portion to thereby provide a generally crescent shaped pumping chamber between said shaft portion and said inner surface means, and oil inlet means provided thru said wall means and communicating with said pumping chamber.

2. The compressor of claim 1 wherein two slots and vanes are provided and said slots are formed on the same diameter of said shaft.

3. The compressor of claim 2 wherein the ratio of the volume in in$^3$ of said pumping chamber to the flow area in in$^2$ of said oil conduit means is from about 1.11 in. to about 1.38 in.

4. The compressor of claim 2 wherein said main section is a circular bore having a diameter of from about 0.15 to about 0.25.

5. The compressor of claim 1 wherein said small segment and said inlet means lie substantially on the same diameter of said shaft.

6. The compressor of claim 1 wherein said oil passage means is in communication with said slot means at said rotational axis.

7. The compressor of claim 1 wherein said wall means is formed in lower bearing means which bearing means longitudinally supports said drive shaft.

8. The compressor of claim 1 wherein said motor means is electrical.

9. The compressor of claim 8 wherein said motor means is electrical three phase.

10. The compressor of claim 1 wherein said compression generating structure comprises one cylinder and piston.

11. The compressor of claim 1 wherein said compression generating structure comprises a single cylinder and piston wherein said piston can be partially pacified by reversing rotation of said shaft.

12. The compressor of claim 11 wherein said piston is mounted on a crankpin of said shaft by bearing means on connecting rod means wherein said bearing means is provided with cam means which is rotatable on the journal of said crankpin and within said bearing means to vary the throw of said crankpin upon reversing the direction of rotation of said shaft.

13. The gas compressor of claim 1 wherein said body means, drive shaft and compression generating structure are contained in substantially hermetically sealed shell means, wherein a lower portion of said shell means is formed to provide an oil sump, wherein a lower portion of said body means is formed to support a lower end of said shaft, both laterally and longitudinally of said shaft, wherein said main section of said oil passage means extends thru a bottom of the lower end of said shaft, and wherein said slot means is formed longitudinally into said bottom of said shaft.

14. The gas compressor of any of claims 1 thru 13 wherein said body means, drive shaft and compression generating structure are contained in substantially hermetically sealed shell means, wherein the lower portion of said shell means is formed tot supports a lower end of said shaft both laterally and longitudinally thereof.

* * * * *